Figure 1:
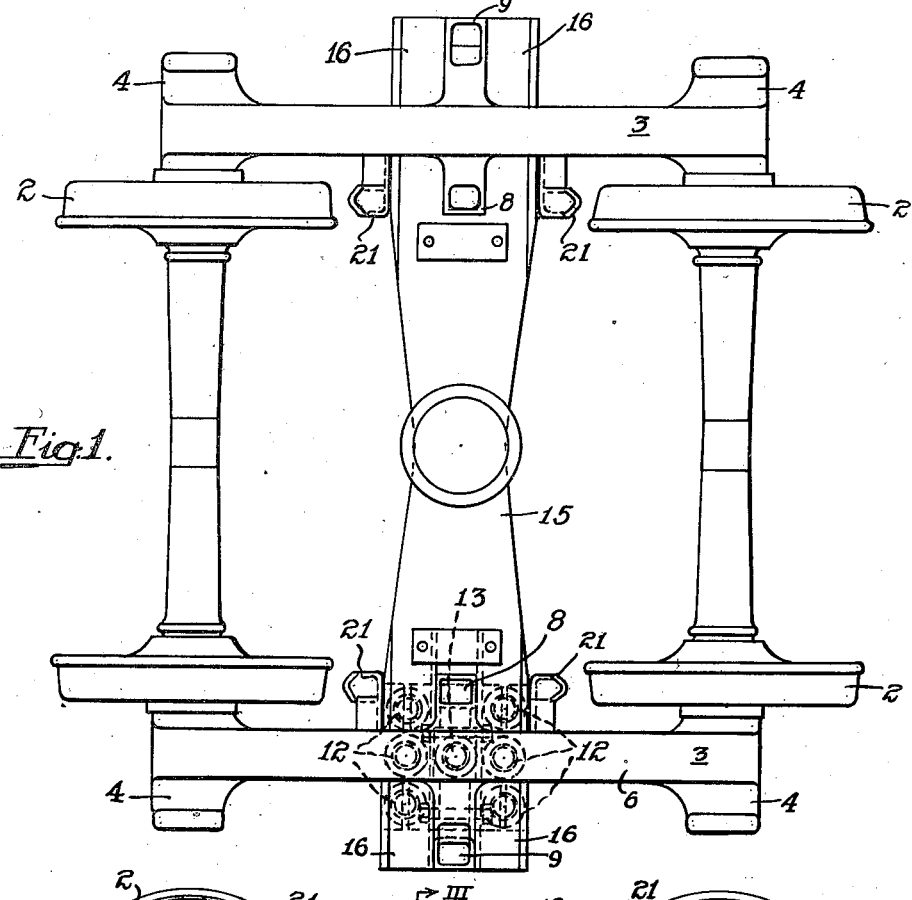

Sept. 14, 1943.   L. E. ENDSLEY   2,329,257
RAILWAY CAR TRUCK
Filed March 13, 1942   3 Sheets-Sheet 1

INVENTOR
Louis E. Endsley
By Archworth Martin
His Attorney

Sept. 14, 1943.   L. E. ENDSLEY   2,329,257
RAILWAY CAR TRUCK
Filed March 13, 1942   3 Sheets-Sheet 2
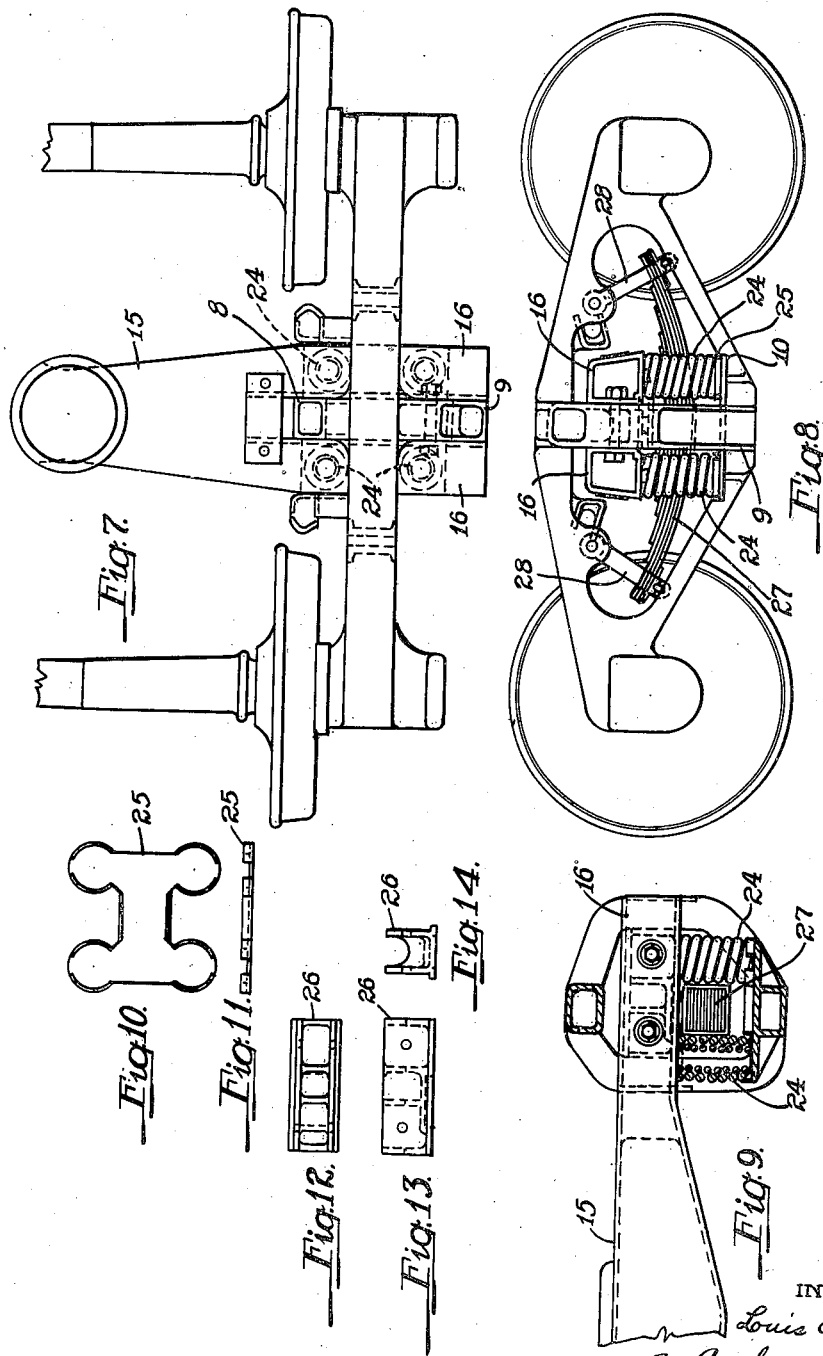

Sept. 14, 1943.    L. E. ENDSLEY    2,329,257
RAILWAY CAR TRUCK
Filed March 13, 1942    3 Sheets-Sheet 3
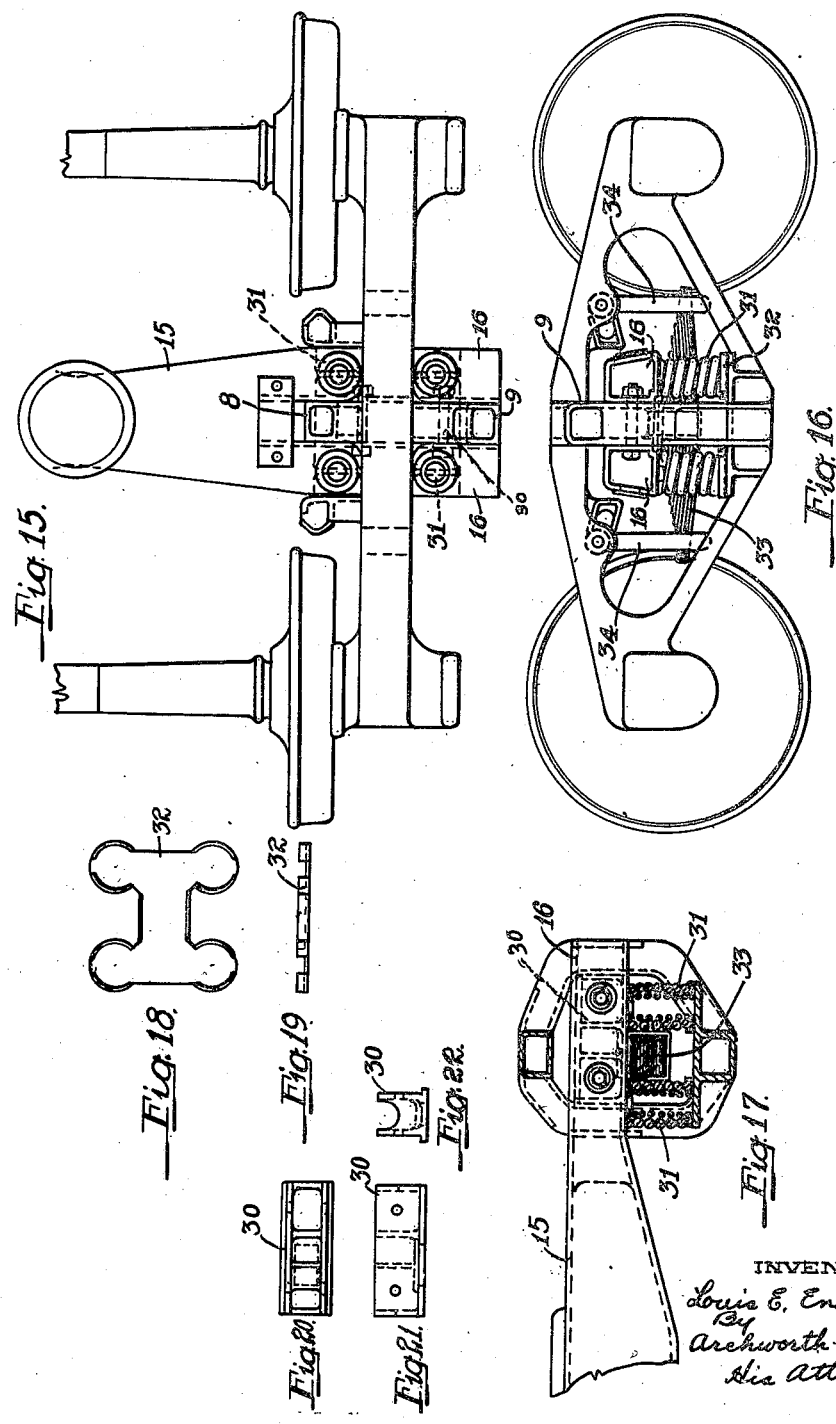

Patented Sept. 14, 1943

2,329,257

UNITED STATES PATENT OFFICE 2,329,257

RAILWAY CAR TRUCK

Louis E. Endsley, Pittsburgh, Pa., assignor to The Frost Railway Supply Company, Detroit, Mich., a corporation of Michigan Application March 13, 1942, Serial No. 434,613

6 Claims. (Cl. 105—197.2)

My invention relates to railroad car trucks and is herein shown and described as applied to that type of car truck wherein there are separately-formed and independently-movable side frames which are maintained in assembled relation by the truck bolster.

Usually the side frames of car trucks are each provided with a pair of columns that connect the compression and the tension elements of the side frame and are spaced apart longitudinally of the frame, with the ends of the truck bolster disposed between these columns, in the mid-portions of the side frame, there being springs interposed between the underside of the bolster and the tension elements of the side frames.

In these prior structures, the guide surfaces on the columns are of narrow dimension in directions laterally of the truck frame, with consequent binding and strains as between the columns and the sides of the bolster, especially when the truck wheels encounter curves in the track rails. Also, the small areas of rubbing surface on the sides of the columns and bolster enlargements produce excessive wear because of the high pressures per square inch. Furthermore, the distribution of forces imposed on the truck frames by the loads on the bolster, are such that the truck frame has to be made heavy in order to withstand the compression and tension forces produced in the side frame truss, due to the secondary or bending stresses that at certain points add to the truss stresses.

One object of my invention is to provide a car truck frame of such form that much wider bolster-guiding and thrust surfaces are provided, in directions transversely of each truck frame, than is possible with truck frames of the type heretofore employed, and without interference with the brackets for the brake hangers, whereby wear between the rubbing or thrust surfaces of the bolster and the side frame columns respectively is reduced, and so that there is increased leverage as between these surfaces, which will reduce the total force required to produce the required slipping of the wheels on the track rails when curves are encountered that are of such short radius that the usual coning of the wheel treads at the vicinity of their flanges is insufficient to compensate for the difference in length of the rails at track curvatures.

Another object of my invention is to provide an extended area of cooperating guide and thrust surfaces that extend in directions transversely of the truck side frames, so that there can be less out-of-line displacement of the bolster and truck frame relative to one another, as when the truck encounters curves in the track.

Still another object of my invention is to provide a truck structure wherein the side frame columns or guides and the bolster are so arranged that a truck frame of given strength and size will better withstand the compression and tension forces produced in the side frame truss as a result of the secondary or bending stresses, and thereby at certain points reduce the maximum stress.

A further object is to provide for a wider or more extended spring seating area on the truck frame, which is desirable because it has been found that trucks with greater spring travel than that recognized as standard produce a better riding car, at high speeds. I secure this greater travel by having a greater number of springs, of lighter cross section.

Another object is to transmit some of the bolster load by long leaf springs to points near the journal boxes, thus relieving the center portion of the side frame of a substantial part of the load, the leaf springs also acting as snubbers or friction springs to reduce vertical vibration of the bolster on the side frames.

Figure 2:
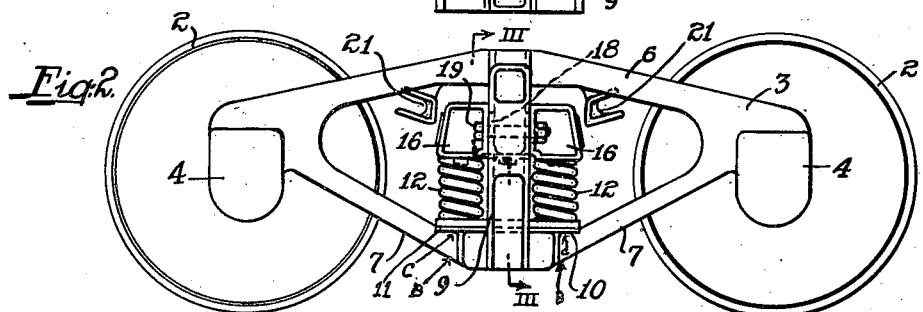
Figure 4:
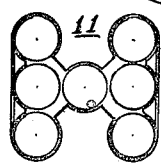
Figure 5:
Figure 6:
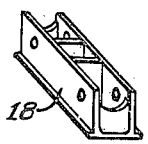
Figure 3:
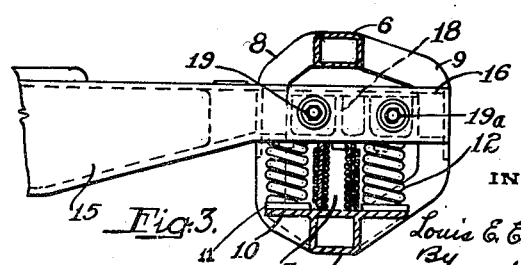

Some of the forms which my invention may take are shown in the accompanying drawings wherein Figure 1 is a plan view of a truck frame; Fig. 2 is a side view thereof; Fig. 3 is a sectional view taken on the line III—III of Fig. 2; Fig. 4 is a plan view of the spring seating plate of the other figures; Fig. 5 is an edge view thereof; Fig. 6 is a perspective view showing the guide block of the other figures; Figs. 7, 8, 9, 10 and 11 are views corresponding to views 1 to 5 respectively, but showing a modified form of truck; Figs. 12, 13 and 14 are plan, side and end views respectively of the guide block of Figs. 7 to 9; Figs. 15, 16, 17, 18 and 19 are views corresponding to Figs. 1 to 5 respectively, but showing still another modification, and Figs. 20, 21 and 22 are plan, side and end views, respectively, of the form of guide block employed in Figs. 15 to 17.

Referring first to Figs. 1 to 6, the truck is shown as provided with the usual wheels 2 and side frames 3 having journal boxes 4 formed thereon, the side frames, however, being in this instance of an improved form as hereinafter explained. The side frames are of identical form, and description of one will apply to both.

The compression element 6 of each side frame has connection with the tension element 7 thereof through a guide column that is composed of inwardly and outwardly bowed elements 8 and 9 respectively, that are integrally formed with the compression member 6, at their upper ends, and at their lower ends are integrally formed with a web 10 and with the tension member 7. The web 10 serves also as a support for a spring seating plate 11 upon which springs 12 and a spring 13 are mounted. There are six springs 12 and a single central spring 13. The springs 12 may be of any conventional form, but in this instance the centrally-located spring 13 is of the friction type, and may suitably be of the form shown in my Patent 2,095,545. These springs all serve to carry the bolster load in the usual manner. Additional friction springs can be substituted for some of the springs 12, it being desirable that they be distributed in a balanced arrangement.

The truck bolster 15 is bifurcated at its ends to form arms 16. These arms extend across the front and rear sides of the column elements 8 and 9 and rest upon the springs 12, which thereby carry the bolster load. The columns 8 and 9 serve as vertical guides for the bolster as it moves up and down in service, and prevent relative displacement of the bolster and the truck frame in directions longitudinally of the truck frame.

A block 18 is disposed between the arms 16 of the bolster, and between the column elements 8 and 9 and is connected thereto by bolts 19 and 19a. The ends of the block 18 are in opposed relation to the column elements 8 and 9 and thus prevent relative displacement of the bolster and side frame in directions laterally of the frame. Also the midportion of the block 18 rests upon the central spring 13 to transmit bolster loads thereto. Slight clearance will be provided between the bolster arms 16 and the columns 8—9, and also between the ends of the block 18 and the columns 8 and 9. The bolt 19a serves also as a tie bolt for the outer ends of the bolster arms and strengthens them, since stresses which tend to bend these arms forwardly and rearwardly relative to one another are reduced or counteracted by the bolt.

It will thus be seen that the elements 8 and 9, being widely spaced, provide for long transverse thrust areas, and without interference by the brake hanger brackets 21. There is thus not only reduced wear as between the bolster and the columns, but there is such leverage that there is less total strain imposed on the columns when the usual slipping of the wheels occurs on sharp or medium curves, than in those structures wherein the column area is of narrow width. Also, the rubbing surfaces at 8 and 9 are such distance apart that there is less angular displacement or misalignment of the bolster relative to the side frames.

It is further to be noted that the truck is of greater strength than comparable trucks of similar size or weight, because the compressive forces of the bolster arms 16 upon the web 10 of the tension member 7 are so distributed that the compression force is equalized by the tensional forces exerted in the tension member 7. Thus, the compression forces exerted through the columns 8 and 9 and the web 10 which tend to bend the midportion of the side frame downwardly and to place the upper edge of the tension member 7 under compression, are equalized by the pull on the tension member 7, which tends to place said member under tension at approximately the points B and under compression at approximately the points C.

Another advantage of the extended bearing areas is that there is space and provision for a larger spring seating area, and consequently for a larger number of springs of slightly larger diameter. Therefore the springs may individually be weaker and allow for as much as three inches vertical bolster movement, which is greater cushioning travel than can be had where a fewer number of necessarily stiffer springs is employed as must be the case in trucks having limited dimensions for accommodation of springs.

Referring now to Figs. 7 to 14, I show a structure that differs from the structure of Figs. 1 to 3, primarily in that a different arrangement of springs is shown. In this instance, four groups of coil springs 24 are employed, which seat upon a spring plate 25 that is carried by the web 10 and the columns 8 and 9. A block 26 is disposed between the arms 16 of the bolster as in the case of Fig. 1, and serves not only to prevent lateral displacement of the truck frame relative to the bolster, but also serves as a seat for the midportion of a semi-elliptic spring 27 which assists the springs 24 in carrying the bolster load and also serves as a snubber to prevent excessive vertical vibrations of the bolster. The outer ends of the spring 27 are supported by hangers 28 which are pivotally hung from the truck frame. This arrangement permits part of the bolster load to be transmitted to points nearer to the journal boxes, thus relieving the center portions of the side frames of a substantial part of the load stresses.

In Figs. 15 to 17 I show an arrangement somewhat similar to that of Figs. 7 to 9, in that the truck frame comprises the divided bolster 15, a guide block 30 bolted between the arms 16 of the bolster and between the columns 8 and 9. Coil springs 31 are interposed between the bolster arms and a spring seating plate 32, as in the case of Fig. 8. In this case, however, a leaf spring 33 is provided of somewhat different form than is the spring 27. Whereas in the spring 27 the leaves are normally curved, the spring 33 has its leaves or laminations normally straight before the load is applied. The spring 33 is supported from the truck frame by pivoted hangers 34. It serves somewhat the same purposes as the spring 33, somewhat less effectively, but is cheaper.

I claim as my invention:

1. A railway truck comprising a pair of side frames, each having vertically-extending column elements that project at its inner and outer sides and approximately midway of its ends, a bolster having bifurcated end portions extending across the front and rear sides of the said elements, a block disposed between the adjacent faces of the said elements and connected to the bolster in position to retain the side frame against sidewise displacement, and springs for supporting the bolster on the side frames.

2. A railway truck comprising a pair of side frames, each having vertically-extending column elements that project at its inner and outer sides and approximately midway of its ends, a bolster having bifurcated end portions extending across the front and rear sides of the said elements, a block disposed between the adjacent faces of the said elements and connected between adjacent bifurcations of the bolster in position to retain the side frame against sidewise displacement, and springs for supporting the bolster on the side frames.

3. A railway truck comprising a pair of side frames, each having vertically-extending column elements that project at its inner and outer sides and approximately midway of its ends, a bolster having bifurcated end portions extending across the front and rear sides of the said elements, a block disposed between the adjacent faces of the said elements and connected between adjacent bifurcations of the bolster, a tie bolt extending through the said bifurcated portions and the block, a bolster-supporting spring upon which the block rests, and additional springs for supporting the bolster on the side frames.

4. A railway truck comprising a pair of side frames each having longitudinally-extending compression and tension elements in vertically-spaced relation, column elements projecting at the inner and outer sides of each side frame and connected to the compression and tension elements thereof, a web carried by the tension element and extending forwardly and rearwardly of the column elements, a bolster having bifurcated end portions at the front and rear sides of the column elements, a block disposed between the column elements and the said portions of the bolster and connected to the bolster, springs interposed between the said portions and the said web, and a spring interposed between said block and the web.

5. A railway truck comprising a pair of side frames each having longitudinally-extending compression and tension elements in vertically-spaced relation, column elements projecting at the inner and outer sides of each side frame and connected to the compression and tension elements thereof, a web carried by the tension element and extending forwardly and rearwardly of the column elements, a bolster having bifurcated end portions at the front and rear sides of the column elements, a block disposed between the column elements and the said portions of the bolster and connected to the bolster, springs interposed between the said portions and the said web, and a laminated spring whose mid portion engages the said block and which at its ends is connected to the truck frame.

6. A railway truck comprising a pair of side frames, each having vertically-extending column elements that project at its inner and outer sides and approximately midway of its ends, a bolster having bifurcated end portions extending across the front and rear sides of the said elements, a block disposed between the adjacent faces of the said elements and connected between adjacent bifurcations of the bolster, and bolster-supporting springs interposed between the block and the side frames.

LOUIS E. ENDSLEY.